United States Patent [19]

Yanagihara et al.

[11] Patent Number: 5,402,281
[45] Date of Patent: Mar. 28, 1995

[54] TRACKING CONTROL APPARATUS OF ROTARY HEAD TYPE RECORDING UNIT USING PILOT SIGNALS OF DIFFERENT FREQUENCIES AND DIFFERENT FORMATS

[75] Inventors: Naofumi Yanagihara, Tokyo; Yukio Kubota; Isao Saito, both of Kanagawa, all of Japan

[73] Assignee: Sony Corporation, Tokyo, Japan

[21] Appl. No.: 29,583

[22] Filed: Mar. 11, 1993

[30] Foreign Application Priority Data

Mar. 13, 1992 [JP] Japan .................................. 4-089435
May 7, 1992 [JP] Japan .................................. 4-114802

[51] Int. Cl.⁶ .......................................... G11B 5/584
[52] U.S. Cl. .............................. 360/77.15; 360/77.14
[58] Field of Search ........................... 360/77.14, 77.15

[56] References Cited

U.S. PATENT DOCUMENTS 4,755,893 7/1988 Yamada et al. ............... 360/77.15
4,843,493 6/1989 Furuhata et al. ............. 360/77.15
5,095,394 3/1993 Yanagihara ................... 360/77.14
5,233,488 8/1993 Yanagihara ................... 360/77.15

FOREIGN PATENT DOCUMENTS 0380284 8/1990 European Pat. Off. .
2753814 7/1981 Germany .

*Primary Examiner*—Aristotelis Psitos
*Assistant Examiner*—James L. Habermehl
*Attorney, Agent, or Firm*—William S. Frommer; Alvin Sinderbrand

[57] ABSTRACT

A tracking control apparatus for a rotary head type recording unit having a first rotary head and a second rotary head for forming pairs of slant tracks on a magnetic type, each track having a head entering side tracking region and a head leaving side tracking region. First and second pilot signals of different frequencies are recorded in the head entering and head laving sides tracking region, with the first pilot signal being recorded at a predetermined position on the first track which precedes (in the track direction) the second pilot signal recorded at a predetermined position on the second track adjacent to the first track.

11 Claims, 13 Drawing Sheets

HEAD LEAVING SIDE

HEAD ENTERING SIDE

Fig. 2
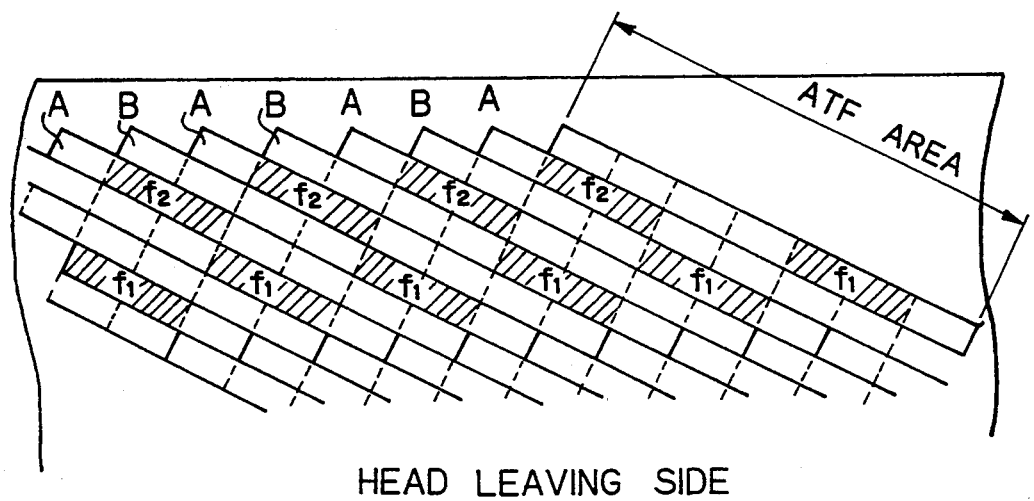
HEAD LEAVING SIDE
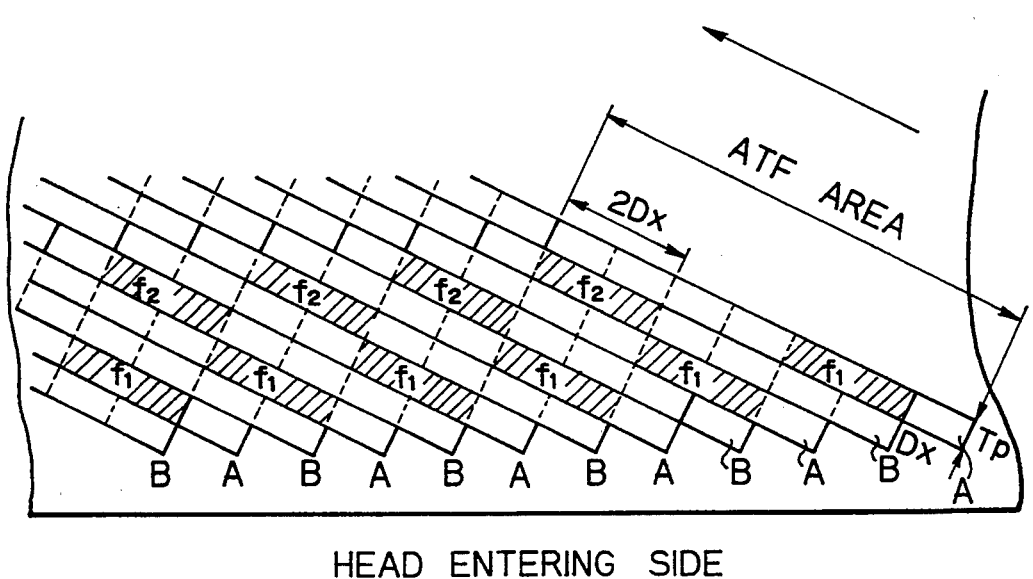
HEAD ENTERING SIDE

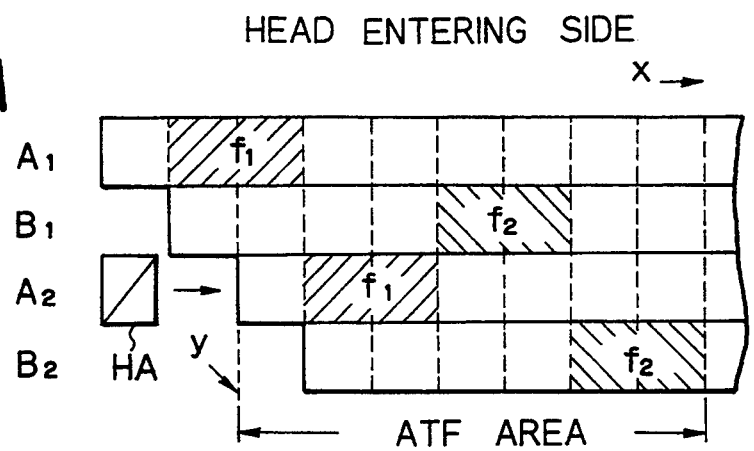
Fig. 5A
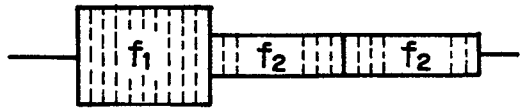
Fig. 5B
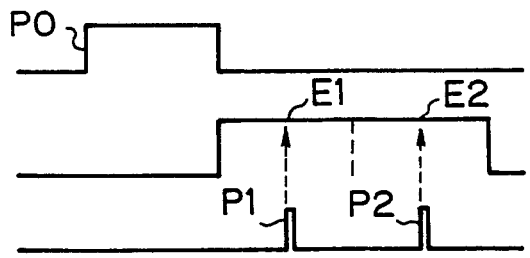
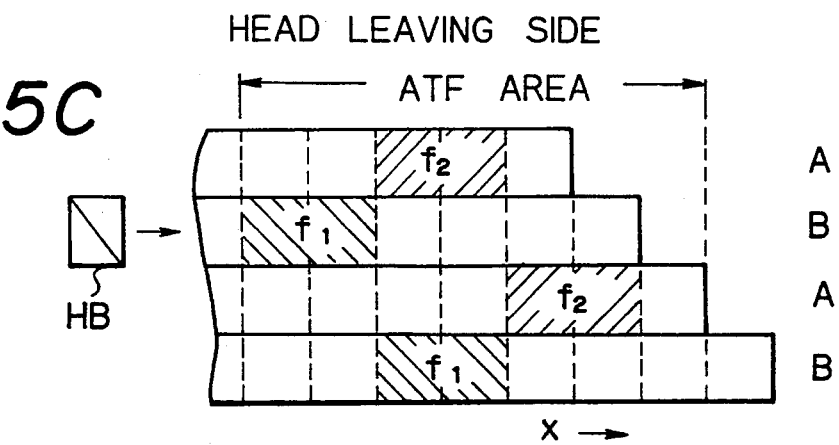
Fig. 5C

Fig. 6
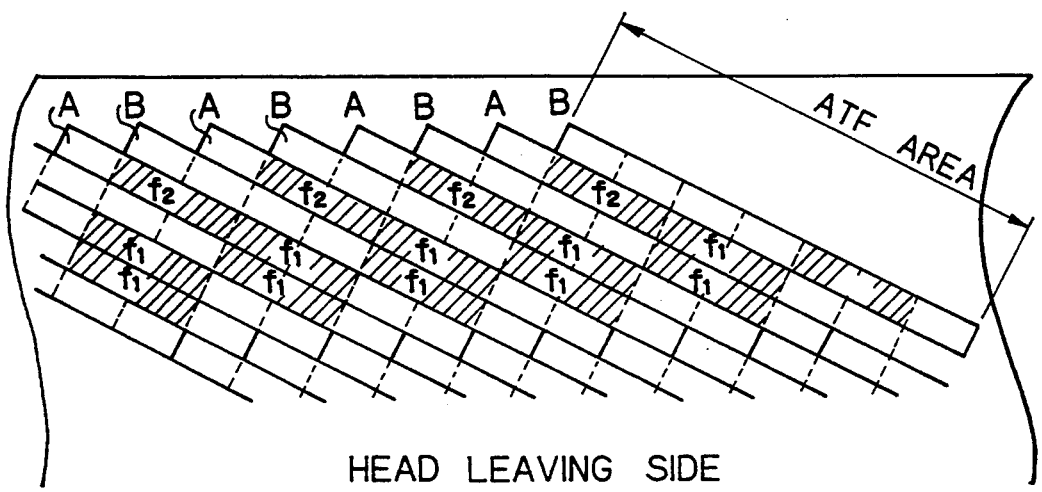
HEAD LEAVING SIDE
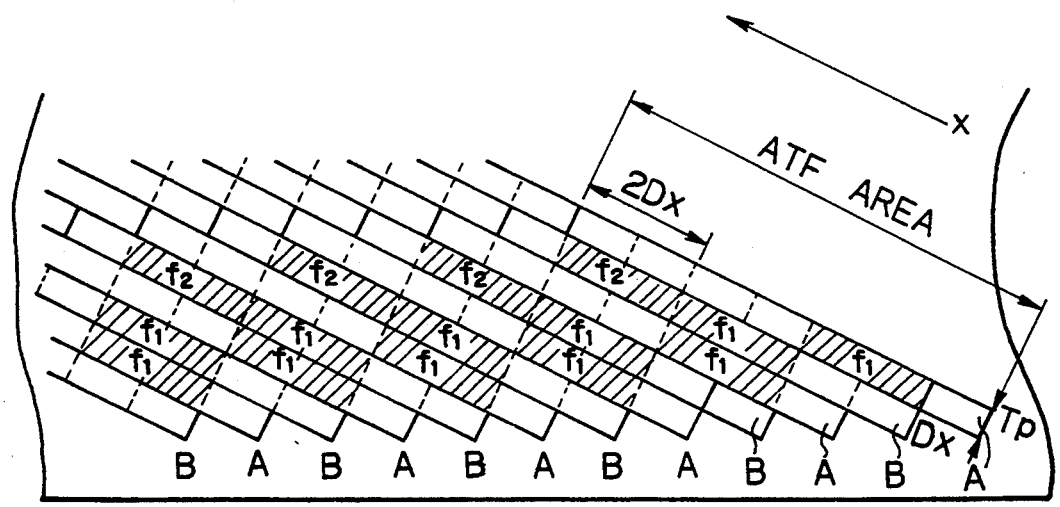
HEAD ENTERING SIDE

Fig. 9
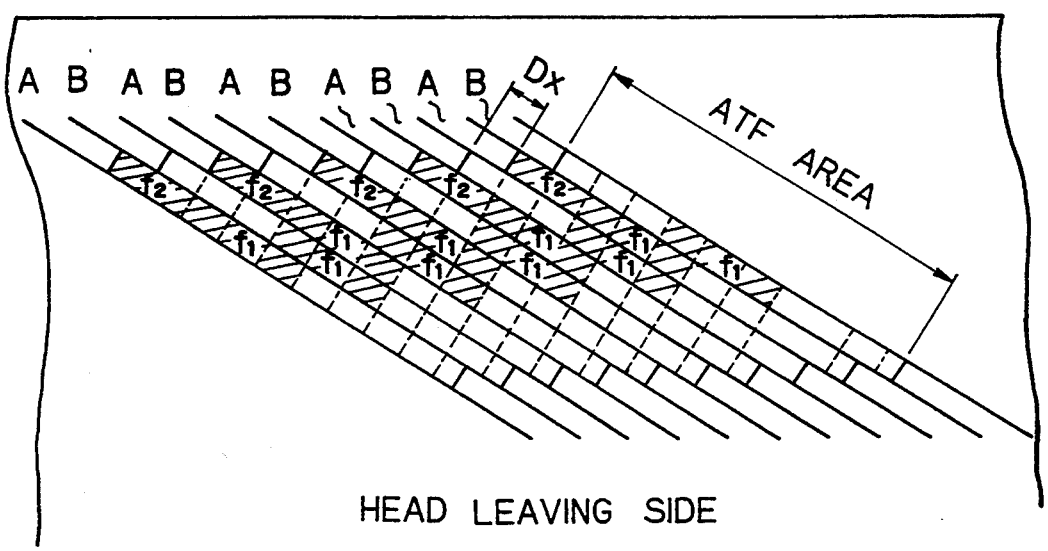
HEAD LEAVING SIDE
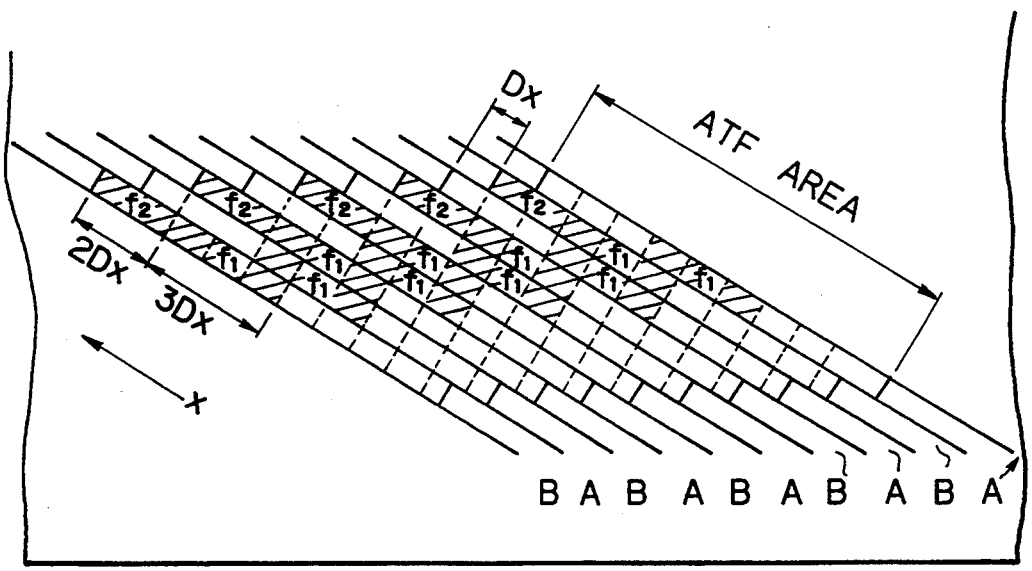
HEAD ENTERING SIDE

TRACKING CONTROL APPARATUS OF ROTARY HEAD TYPE RECORDING UNIT USING PILOT SIGNALS OF DIFFERENT FREQUENCIES AND DIFFERENT FORMATS

BACKGROUND OF THE INVENTION

1. Field of the Invention

The present invention relates to a tracking control apparatus of a rotary head type recording unit using pilot signals for detecting a tracking error.

2. Description of the Prior Art

A VTR with a pair of rotary heads for forming slant tracks on a magnetic tape wound around a tape guide drum is known. In addition, a digital VTR which records a digital video signal, a digital audio signal, and control/display digital sub data in tracks on a time division basis has been proposed. Moreover, for a digital VTR, a tracking control apparatus which records a tracking control pilot signal in respective regions, disposed at opposite ends of a track (these regions are referred to as ATF areas) is also known.

FIG. 16 is a schematic diagram showing the results of a conventional recording system for recording an ATF pilot signal on each track. In FIG. 16 and the description that follows, x represents the scanning direction of a pair of rotary heads; y represents the traveling direction of a magnetic tap, A and B represent tracks formed by the rotary heads; Dx represents the offset distance between the ends of a track A and a track B just adjacent thereto; a hatched region represents a record area of a pilot signal. The extended direction of a gap formed on one of the heads in a pair differs from that of the other head in that pair so as to provide an azimuth loss which reduces crosstalk between two tracks. In FIG. 16, for simplicity, slant tracks are horizontally depicted.

The length of the record region of a pilot signal is defined as multiples of the offset distance Dx. The offset distance Dx is mechanically defined by the rotation of the drum and the travel of the tape of a VTR. As opposed to the present invention, in the prior art shown in FIGS. 16 and 17, the pilot signal has only one frequency. In this example, the frequency f is set to approximately 1 MHz. On each track A, the pilot signal is recorded in the first DX region and the fourth DX region. On each track B, the pilot signal is recorded in the third DX region. The pilot signal is repeatedly recorded in such a sequence. The length necessary for controlling a tracking operation is 5 Dx. This length is referred to as an ATF area. FIG. 16 shows a record pattern of the pilot signal on the side of the track where the rotary head enters (namely, the head entering side). However, the record patter on the head leaving side is the same as that on the head entering side.

When recording signals are reproduced from a magnetic tape on which the pilot signal is recorded according to the record pattern as shown in FIG. 16, a tracking error is detected as follows. When one head with the same azimuth angle as a track A scans this track, it reproduces a pilot signal from this track, a crosstalk of a pilot signal from one of the two adjacent racks, and then a crosstalk of a pilot signal from the other. When the other head with the same azimuth as track B scans this track, it reproduces a pilot signal from this track, a cross talk of a pilot signal from one of the two adjacent racks, and then a crosstalk of a pilot signal from the other.

In the ATF area, the first reproduction output of the pilot signal on the same azimuth track is relatively large. This reproduction output is used as a timing reference. With this timing reference, the levels of the crosstalks of the two adjacent tracks are sampled and held. By using the difference of the outputs which were sampled and held, the direction and amount of a tracking error can be detected.

As shown in FIG. 16, when the record region of a pilot signal is set to the offset distance Dx, unless the value of Dx is satisfactorily large, due to deviation of rotation of the rotating drum, deviation of record pattern, and so forth, the accuracy of the timing reference used for the sampling/holding process and the accuracy of the sampling/holding process itself will degrade. As a result, a tracking error cannot be correctly detected.

As a method for solving this problem, the length of the record region of a pilot signal can be doubled (namely, 2 Dx) as shown in FIG. 17. However, the length of the ATF area likewise becomes long. To maximize the record area for digital information signals on each track, the length of the ATF area should be as short as possible.

In addition, when a pilot signal has been recorded on a magnetic tape as shown in FIGS. 16 and 17, if the head positions deviate from the respective track positions, it takes a long time until a proper tracking occurs. In other words, when one head with an azimuth angle different from a particular track enters this track, the reproduction output of the pilot signal as a timing reference is small due to azimuth loss and thereby the sampling pulse for detecting a crosstalk level cannot be formed. Thereafter, due to a speed error of the capstan, the tracking state gets gradually disordered. After the pilot signal for a timing reference is reproduced, the tracking control operation can be performed. Thus, in such situations as just after the capstan motor starts rotating and when a large track deviation as large as one track takes place due to an external disturbance, it takes a long time until a normal tracking state occurs.

OBJECTS AND SUMMARY OF THE INVENTION

Therefore, an object of the present invention is to provide a tracking control apparatus with long record regions for pilot signals so as to stably perform a tracking control operation but without the tradeoff of a decrease in the data record regions.

Another object of the present invention is to provide a tracking control apparatus for quickly performing a tracking control operation in such situations as just after the capstan motor starts rotating and when a large external disturbance occurs.

According to an aspect of the present invention, there is provided a tracking control apparatus for a rotary head type recording unit having a first rotary head and a second rotary head for forming slant tracks on a magnetic tape, with a first track and a second track forming a pair, each having a head entering side tracking region and a head leaving side tracking region, the head entering side tracking region being disposed in the vicinity of a head entering side of the first and second tracks, the head leaving side tracking region being disposed in the vicinity of a head leaving side of the first and second tracks.

A circuit generates first and second pilot signals for controlling a tracking operation, the frequency of the first pilot signal being different from that of the second pilot signa; and at the head entering side tracking region the first pilot signal is recorded at a predetermined position on the first track and the second pilot signal is recorded at a predetermined position preceded by the first pilot signal recording region on the second track just adjacent to the first track. In the head leaving side tracking region the first pilot signal is recorded at a predetermined position on the second track and the second pilot signal is recorded at a predetermined position preceded by the first pilot signal recording region on the first track just adjacent to the second track.

The first pilot signal generates a timing reference and the second pilot signal detects the tracking error. Thus, even if the record region of each pilot signal is widened, the ATF area is not widened. In addition, since the two adjacent racks on which the first and second pilot signals are recorded at the head entering side are the reverse of those at the head leaving side, even if head clog takes place, the tracking control operation can be performed.

The above, and other, objects, features and advantage of the present invention will become readily apparent from the following detailed description thereof which is to be read in connection with the accompanying drawings.

BRIEF DESCRIPTION OF THE DRAWINGS

FIG. 2 is a schematic diagram showing an example of a record pattern of pilot signals according to the FIG. 1 embodiment of the present invention;

FIGS. 5A to 5C are schematic diagrams for explaining the tracking error detection process;

FIG. 6 is a schematic diagram showing another example of a record pattern of pilot signals;

FIG. 9 is a schematic diagram showing a further example of a record pattern of pilot signals;

DETAILED DESCRIPTION OF THE PREFERRED EMBODIMENTS

Next, an embodiment according to the present invention will be described. This embodiment is a digital VTR which records a digital video signal, a digital audio signal, and control sub data on a magnetic tape in a predetermined track format. On the magnetic tape, a digital video signal for one frame is recorded along with a digital audio signal and sub data in a plurality of tracks (10 tracks In the NTSC system). In this VTR, a pair of rotary heads with different azimuth angles is used. Practically, two heads disposed at internals of 180° on a rotating drum may be used. Alternatively, a double azimuth head assembly which has to closely disposed gaps with different azimuth angles may be used.

Figure 1:
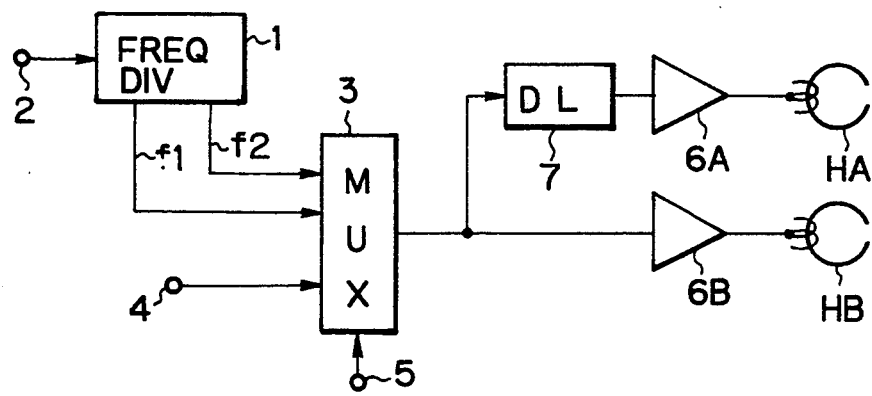
FIG. 1 is a block diagram showing the construction of a record circuit of pilot signals according to an embodiment of the present invention.

FIG. 1 is a block diagram showing the construction of a record circuit for recording pilot signals used for a tracking control operation. In the figure, reference numeral 1 is a frequency division circuit. The frequency division circuit 1 receives a system clock from an input terminal 2. The frequency division circuit 1 generates a first pilot signal with frequency f1 and a second pilot signal with frequency f2. The relation between the frequency f1 and the frequency f2 is as follows:

$f1 = f0/33 = 656$ kHz $f2 = f0/22 = 984$ kHz where f0 is the frequency of the system clock. The values of these frequencies are only examples. However, the relation of (f1 ≈ f2) should be satisfied. Preferably, the relations (f1 < f2) should be satisfied.

This is because the frequency f1 of the first pilot signal should be so low that a pulse signal which functions as a timing reference can be generated when the pilot signal is reproduced by a head with a different azimuth angle than that with which it was recorded. In addition, when a tracking error is determined, the crosstalk of the pilot signal of frequency f2 is detected. However, the crosstalk component of f1 should differ from the crosstalk component of f2 so that they can be separated by a filter. Moreover, when the width of the heads is large and a large track deviation takes place, the frequency f2 should be sufficiently high that the crosstalk component of f2 from a track spaced farther away can be suppressed by azimuth loss.

Two pilot signals of the frequency division circuit 1 are supplied to a multiplexer 3. The multiplexer 3 receives from an input terminal 4 data to be placed in a data area of each track. The multiplexer 3 is controlled by a control signal received from an input terminal 5 according to a track format where an ATF area is disposed at both the ends of one track (these ends are referred to as the head entering side and the head leaving side). In the data area, a digital video signal, 1 a digital audio signal, and sub data are recorded on a time division basis.

An output signal of the multiplexer 3 is supplied to a rotary head HB through a record amplifier 6B. In addition, the output signal is supplied to a rotary head HA through a delay circuit 7 and a record amplifier 6A. The rotary heads HA and HB have a double azimuth construction. The delay circuit 7 causes the two heads to record respective data at the same time. Thus, with one scanning operation, both tracks A and B are formed at the same time.

FIG. 2 is a schematic diagram showing record patterns of pilot signals recorded on the head entering side and the head leaving side of a magnetic tape. The pilot signals are recorded at positions which are represented by multiples of the offset distance Dx between adjacent tracks. The length of the ATF area is 7 Dx. The example of FIG. 2 shows SP (standard play)mode where the track pitch Tp is 9 μm, the offset distance Dx is 4.54 μm, the length of the ATF area is 22.7 μm, and the width of each head is 10.5 μm.

On the head entering side of track A, in the first Dx region, no pilot signal is recorded. In the next 2 Dx regions, a first pilot signal (f1) is recorded. In the remaining regions of the ATF area, no pilot signal is recorded. On the head entering side of each track B, in the first 4 Dx regions, no pilot signal is recorded. In the next 2 Dx regions, a second pilot signal (f2) is recorded. The multiplexer 3 is controlled so that the pilot signals are recorded according to this format.

On the head leaving side, the pilot signals are recorded in the reverse relation of the head entering side. Differently stated, a first pilot signal f1 is recorded in the Dx region which is positioned in the fifth and sixth Dx regions in the scanning direction of the heads in the ATF area of each track B. A second pilot signal f2 is recorded in the second and third Dx regions in the ATF area of each track A. The relative positions between the heads and the magnetic tape can be obtained by magnetically detecting the rotation of the rotating drum. The control signal of the multiplexer is formed of this detected result and the clock timing.

Figure 3:
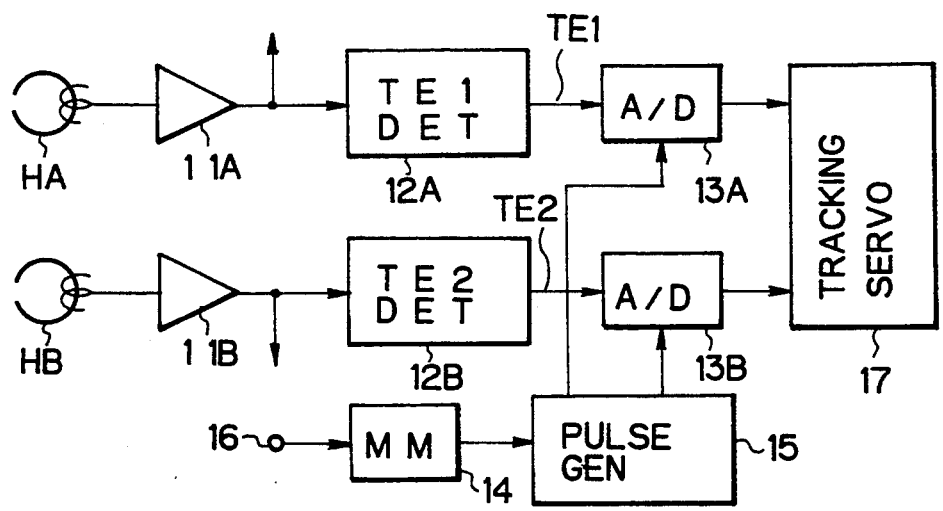
FIG. 3 is a block diagram showing the construction of a reproduction circuit for pilot signals according to the FIG. 1 embodiment of the present invention.

The pilot signals recorded In the above-mentioned manner are reproduced by the rotary heads HA and HB as shown in FIG. 3. The reproduction signals are supplied to tracking error detection circuits 12A and 12B through reproduction amplifiers 11A and 11B, respectively. In addition, the reproduction signals are supplied to a reproduction signal process circuit (not shown in the figure) so as to reproduce a digital video signal, a digital audio signal, and sub data.

The tracking error detection circuits 12A and 12B output error signals TE1 and TE2. The error signals TE1 and TE2 are sent to A/D converters 13A and 13B, respectively. The A/D converters 13A and 13B convert the error signals TE1 and TE2 into digital signals. The A/D converters 13A and 13B receive sampling pulses from a pulse generation circuit 15 driven by a monostable multivibrator 14. The monostable multivibrator 14 receives a rotating drum detection signal from an input terminal 16. The resultant tracking error signals TE1 and TE2 are supplied to a tracking servo circuit 17. The tracking servo circuit 17 includes a microcomputer. The tracking servo circuit 17 forms a tracking control signal. The tracking control signal is supplied to a servo circuit of a capstan motor. The servo circuit controls the tape speed so that the reproduction signals can be correctly tracked. As a tracking control means, in addition to a means for controlling the tape speed, a means for displacing the height of the tape heads by using piezo-electric elements can be used.

Figure 4:
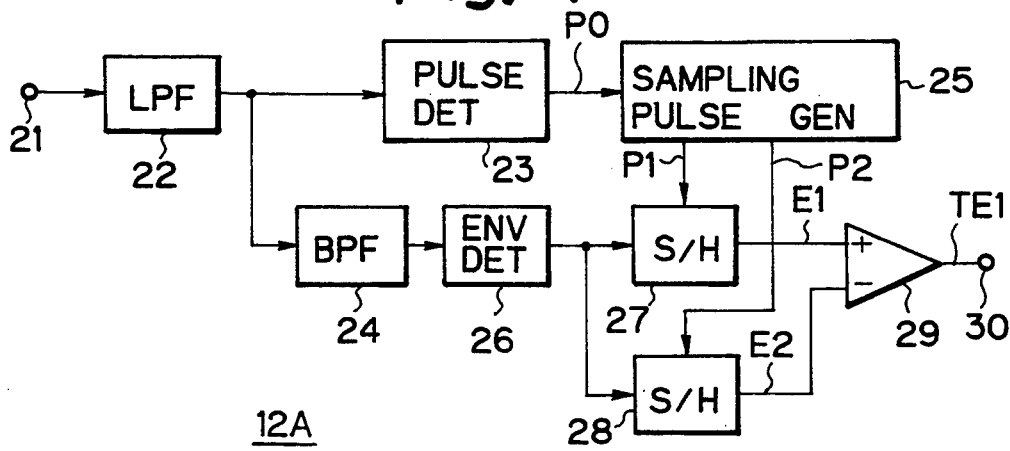
FIG. 4 is a block diagram showing one example of the construction of a tracking error detection circuit provided in the reproduction circuit of FIG. 3.

The tracking error detection circuit 12A has a construction of the type shown in FIG. 4. Reproduction signals are supplied from an input terminal 21 to a low-pass filter 22. The low-pass filter 22 passes pilot signals with frequencies f1 and f2. The low-pass filter 22 is connected to a pulse detection circuit 23 and a band-pass filter 24. The band-pass filter 24 passes the component of frequency f2.

The pulse detection circuit 23 forms a pulse signal P0 according to the pilot signal with frequency f1. This pulse signal P0 is supplied to a sampling pulse generation circuit 25. The sampling pulse generation circuit 25 outputs sampling pulses P1 and P2. The sampling pulses P1 and P2 are supplied to sample/hold circuits 27 and 28, respectively. The sample/hold circuits 27 and 28 receive the output signal of the band-pass filter 24 through an envelop detection circuit 26. The sample/hold circuits 27 and 28 output signals E1 and E2, respectively. The output signals E1 and D2 are supplied to a subtraction circuit 29. The subtraction circuit 29 outputs a tracking error signal (E1–E2) from an output terminal 30.

The tracking error detection circuit 12B has the same construction as the tracking error detection circuit 12A shown in FIG. 4. Next, with reference to FIG. 5, a tracking error detection process will be described. FIG. 5A shows a part of the record pattern on the head entering side shown in FIG. 2. In FIG. 5, for simplicity, it is assumed that the width of the heads is equal to the track pitch and deviations in the waveform of the reproduction output are ignored.

When the rotary head HA scans a track A, it reproduces the signal shown in FIG. 5B. The reproduction signal includes a pilot signal (f1) with a large level because the pilot signal (f1) was recorded with the same azimuth as head HA, a crosstalk of a pilot signal (f2) of an adjacent track (namely, an upper track $B_1$ in FIG. 5A), and a crosstalk of a pilot signal (f2) of another adjacent rack (namely, a lower track $B_2$ in FIG. 5A).

The envelop of the crosstalk component is proportional to the amount of deviation of the head HA from the center of the track A. The pulse detection circuit 23 of the tracking error detection circuit 12A generates a pulse signal P0 in response to the pilot signal with frequency f1 as shown in FIG. 5B. According to for example a trailing edge of the pulse signal P0, sampling pulses P1 and P2 are generated. The sample/hold circuits 27 and 28 sample the envelop of the crosstalk of the pilot signal with frequency f2 by using the sampling pulses P1 and P2. Thus, the subtraction output of the signals E1 and E2 (namely, the tracking error signal TE1) is formed.

The level and polarity of the tracking error signal TE1 represent the amount and direction of deviation of the head HA from the enter of the relevant track. When there is no track deviation, the level of the signal TE1 is zero. The head HA deviates upwardly in FIG. 5A, the polarity of the signal TE1 is plus (+) and the level thereof accords with the amount of deviation (error). When the head HA deviates downwardly in FIG. 5A, the polarity of the signal TE1 is minus (−) and the level thereof accords with the amount of deviation (error).

On the head leaving side shown in FIG. 5C, the tracking error detection circuit 12B detects a tracking error. In other words, when the rotary head HB scans a track B, it can detect a tracking error in the same manner as described above. Thus, a tracking error signal TE2 is generated. The tracking servo circuit 17 calculates the average value of the tracking error signals TE1 and TE2 and controls the tape speed accordingly. When one of the rotary heads HA and HB clogs, the corresponding tracking error signal becomes zero. In this situation, the head clog is detected by another means and only the tracking error signal derived from the non-clogged head is treated as a valid signal.

In addition, since the frequency f1 of the first pilot signal is low, even if the azimuth of the head which reproduces this pilot signal is different from the head which recorded it, a relatively large reproduction output can be obtained. Thus, in such situations as just after the capstan motor starts rotating and when an external disturbance takes place, even if the rotary heads HA and HB scan tracks that were recorded with different azimuths, these heads each can obtain a crosstalk of a first pilot signal (f1) of an adjacent track so that the pulse signal P0 can be formed. Thus, pulses P1 and P2 used for sampling the envelop of a crosstalk of the second pilot signal can be formed. As a result, the tracking servo can operate properly, thereby reducing the tracking adjustment time.

FIG. 6 shows another example of a record pattern of pilot signals. In this example, an additional first pilot signal (f1) is recorded in two Dx regions followed by the regions of the second pilot signal (f2) of the record pattern shown in FIG. 2. Even if a head with an azimuth angle different from that which recorded a given track scans this track, this first pilot signal followed by the second pilot signal allows a pulse signal as timing reference to be securely generated.

Figure 7:
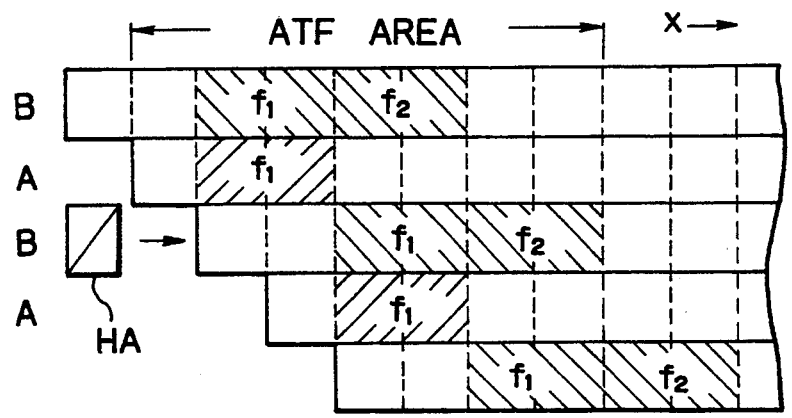
FIG. 7 is a schematic diagram showing a part of FIG. 6.
Figure 16:
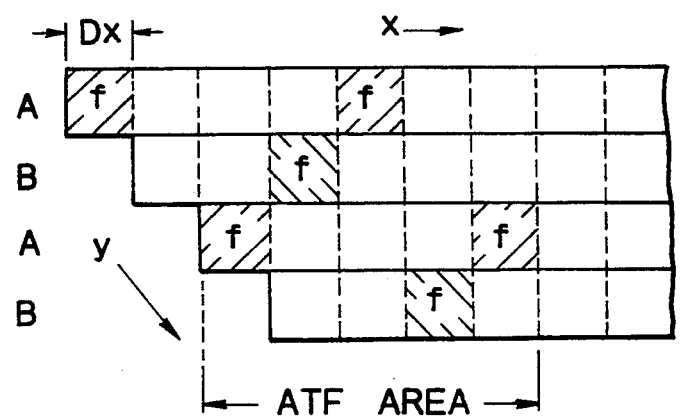
FIG. 16 is a schematic diagram showing an example of a conventional record pattern of pilot signals.
Figure 17:
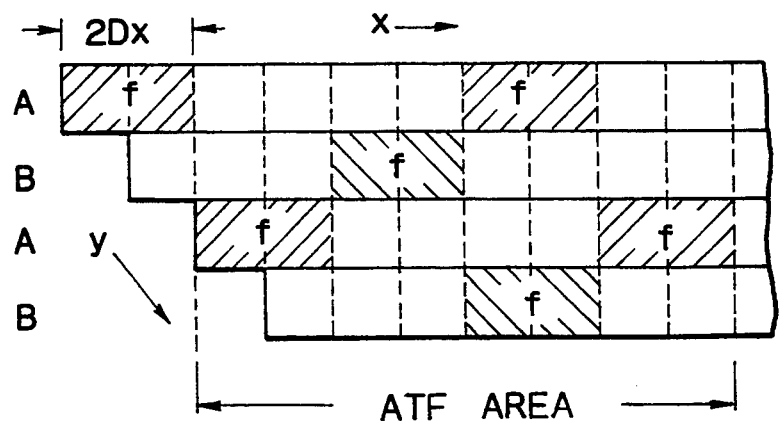
FIG. 17 is a schematic diagram showing another example of a conventional record pattern of pilot signals.

FIG. 7 is an enlarged view of the ATF area on the head entering side of FIG. 6. As shown in FIG. 7, when the rotary head HA scans a track B which was recorded with a different azimuth angle than head HA, it can generate a pulse signal P0 when it scans the regions of the pilot signal (f1) of the track B. Thus, the rotary head HA can detect crosstalk of the next pilot signal (f2) on the track B. Thereafter, the rotary head HA attempts to detect crosstalk of the pilot signal (f2) of a track B downwardly spaced by two tracks. However, since the crosstalk component is scarcely present, the rotary head HA obtains a tracking error signal TE1 with a large level. Thus, the track deviation (i.e. head HA is scanning track B and not track A) can be quickly compensated.

Figure 8:
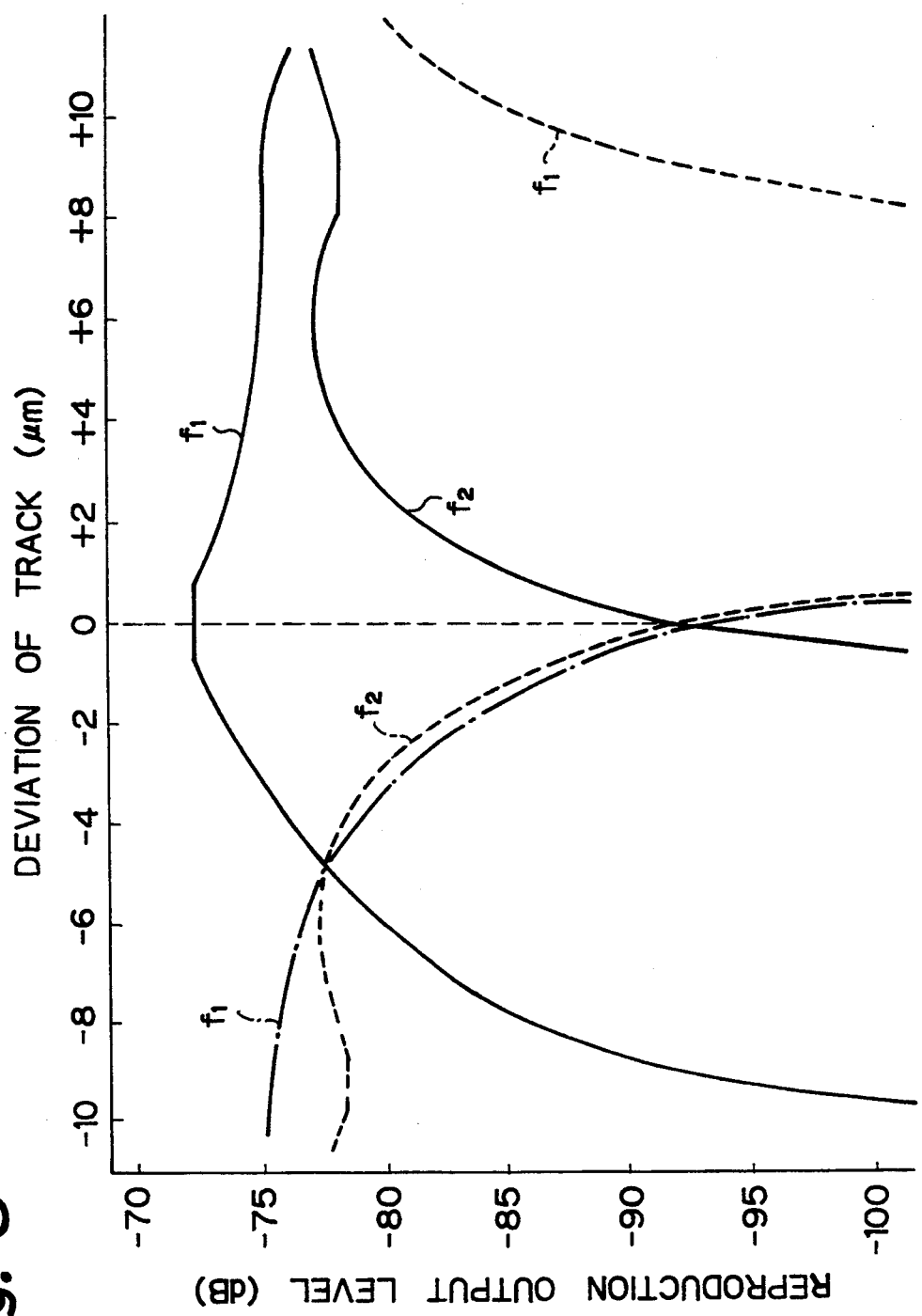
FIG. 8 is a graphical representation showing the measurement result of the output levels of reproduced pilot signals.

FIG. 8 graphically depicts measurement result of the levels of the reproduction outputs of the pilot signals in the record pattern of FIG. 6 in the SP mode. The horizontal axis of FIG. 8 represents the amount of track deviation ($\mu$m), whereas the vertical axis thereof represents the levels of the reproduction outputs (in dB). Since the track pitch Tp is 9 $\mu$m, when the amount of track deviation becomes $+4.5$ $\mu$m, the relevant head is positioned at the boundary of the upper track. When the amount of track deviation becomes $-4.5$ $\mu$m, the relevant head is positioned at the boundary of the lower track.

As shown by broken lines and solid lines of FIG. 8, the crosstalk component of a pilot signal (f2 on an adjacent track varies symmetrically with respect to the zero position of the track deviation. Thus, a tracking error can be detected in the manner as described above. In addition, even if the track deviation increases in the plus (+) direction, since the pilot signal (f1) is present on the right side track and the azimuth loss is small, the reproduction output level of the pilot signal (f1) is maintained as shown by the solid line. On the other hand, when the track deviation increases in the minus (−) direction, since the pilot signal (f1) is present on the lower track, the reproduction output level is maintained. Thus, even if a track deviation up to approximately one track width takes place in any direction, a pulse signal P0 used as timing reference can be formed.

In addition, to precisely detecting the track deviation for up to approximately one track width, the level of the crosstalk of the pilot signal of a track downwardly spaced from the scanned track by two tracks should be quite small. Thus, the value of the frequency (f2) should be sufficient that the crosstalk can be decreased by an azimuth loss. As a result the frequencies of the two pilot signals should satisfy the relation (f1<f2).

In addition to the above-mentioned SPO mode, this embodiment can be applied to the (long play) LP mode. The tape speed of the LP mode is slower than that of the SP mode. As an example, in the LP mode, the track pitch Tp is 6 $\mu$m. However, the width of the heads in the LP mode is the same as that in the SPO mode (namely, 10.5 $\mu$m).

FIG. 9 shows a record pattern of pilot signals in the LP mode. On the head entering side of each track A, a first pilot signal (f1) is recorded in 3 Dx regions. On the head entering side of each track B, the pilot signal (f1) is recorded in 3 Dx regions and the second pilot signal (f2) is recorded in the next 2 Dx regions. On the head leaving side, the above pilot signals are recorded in reverse relation to the head entering side. In the LP mode, a pattern (not shown in FIG. 9) where a pilot signal f1 is not followed by a pilot signal f2 can be used. The frequencies f1 and f2 of pilot signals in the LP mode are the same as those in the SP mode. Even if the width of the heads is much larger than the track pitch, which is the case in the LP mode, the value of the frequency f2 should be selected so that the crosstalk component of the pilot signal with frequency f2 from a track downwardly spaced from the scanned track by two tracks can be suppressed.

Figure 10:
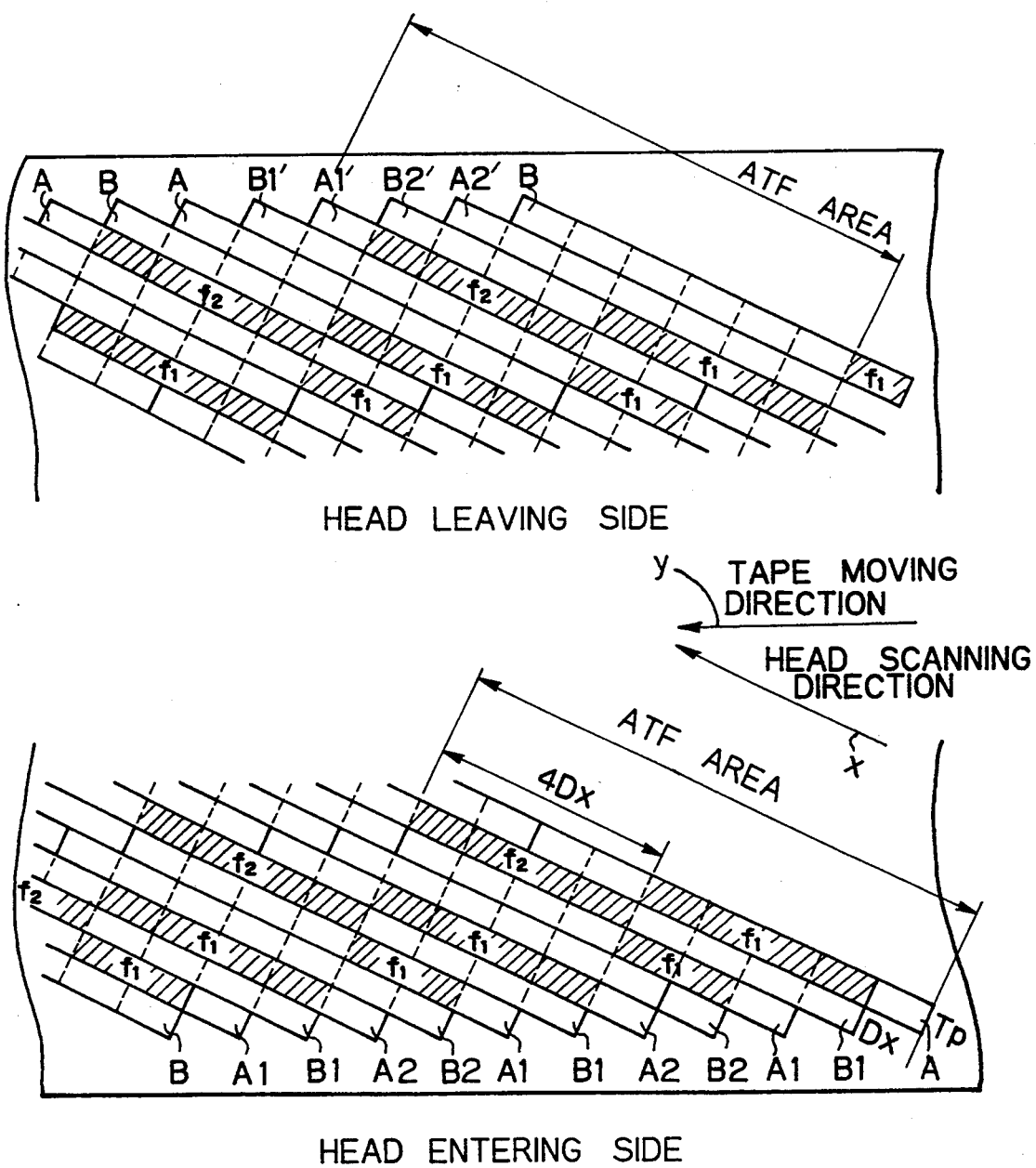
FIG. 10 is a schematic diagram showing another example of a record pattern of pilot signals according to the present invention.

FIG. 10 shows an example of a record pattern of another embodiment according to the present invention. In the figures, a tracking detection signal (frequency f2) with any length is recorded in predetermined tracks so that crosstalk of pilot signal f2 is not detected at the same time from two tracks (for example, f2 is recorded in every fourth record track). On a record track A1 which is adjacent track B1 where the tracking detection signal f2 is recorded, a first identification signal (frequency f1) is recorded. On a record track A2 which is the other track adjacent track B1, a second identification signal (frequency f1) is placed.

In the figure, arrow x represents the scanning direction of the rotary heads, whereas y represents the direction of tape movement. For example, on the head entering side, a first identification signal (frequency f1) with a length of, for example, 2 Dx is recorded in a predetermined region of a first record track A1 which is disposed at intervals of four record tracks. In addition, a tracking detection signal (frequency f2) with a length of, for example, 4 Dx is recorded in a predetermined region of a second record track B1 just adjacent to the record track A1.

A second identification signal (frequency f1) with a length of, for example, 4 Dx is recorded in a predetermined region of a third record track A2. However, these signals (frequencies f1 and f2) are not recorded on a fourth record track B2. The first to fourth record tracks A1 to B2 are repeatedly recorded at intervals of four tracks. On the head leaving side, first and second identification signals and a tracking detection signal which are the same as those on the head entering side are recorded in the reverse relation thereof.

In the figure, the first identification signal f1 is detected from the signals reproduced from the first record track A1 on the head entering side. After the first identification signal becomes low and after the rotary head scans a region of 2 Dx, the level of crosstalk from the tracking detection signal f2 is detected. Next, a second identification signal f1 is detected from the signals reproduced from the third record track A2. After the second identification signal becomes low and after the lead scan a region of 2 Dx, the level of crosstalk from the tracking detection signal f2 is detected. Tracking control is performed so that these detected crosstalk levels match.

In this example, the tracking detection signal f2 is recorded in intervals of, for example, four record tracks. Thus, the crosstalk of tracking detection signals from two tracks is not detected at the same time. As a result, the length of this tracking detection signal can be freely set (for example, by a monostable multivibrator 46 shown in FIG. 11).

In this example, the length of the tracking detection signal f2 is 4 Dx. However, the length of the tracking detection signal can be longer than 4 Dx. Nevertheless, since a tracking detection area (AFT area) should not overlap with a record signal area, the maximum length of this signal is accordingly restricted. However, the length of this signal can be longer than 2 Dx. Although tracking detection is performed at intervals of four tracks, in the case of a multi-track record format, the number of times that tracking control is carried out in a predetermined period (frame) is not decreased.

In the above-mentioned record pattern, the length of a tracking detection signal f2 can be freely set, thereby liberalizing the compatibility of products. As a result, restrictions on the production of products, such as an increase of the number of adjustment steps and a decrease in the yield of the products, can be removed.

Figure 11:
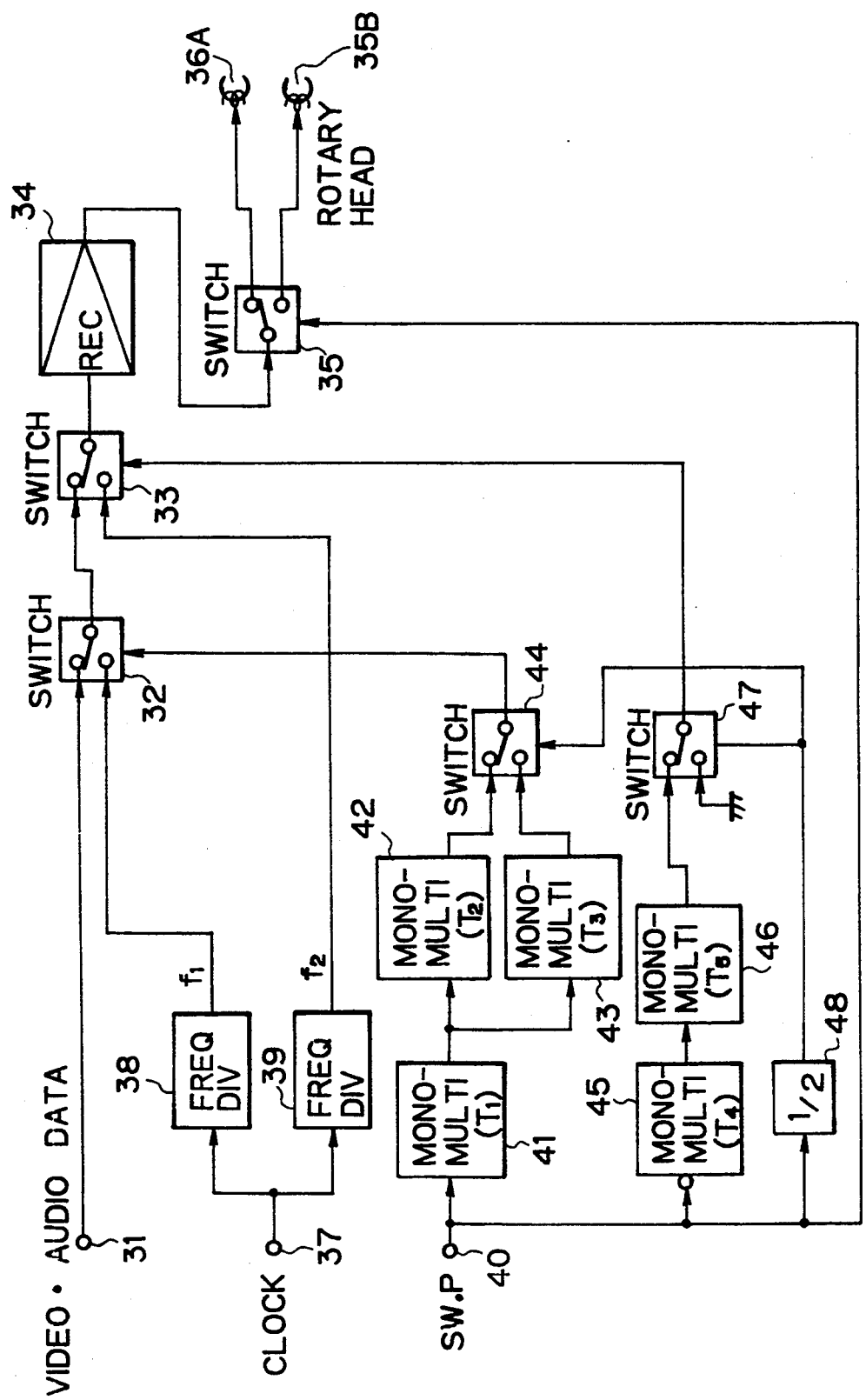
FIG. 11 is a block diagram showing an example of the construction of a recording apparatus according to the present invention.

FIG. 11 shows the construction of an example of a recording apparatus for recording the above-mentioned record pattern. IN the figure, reference numeral 31 is an input terminal to which record signals, such as video data and audio data, are supplied. The record signals received from the input terminal 31 are supplied to a record amplifier 34 through selector switches 32 and 33. The output signal of the record amplifier 34 is supplied to rotary heads 36A and 36B through a head selection switch 35.

Reference numeral 37 is a terminal to which a clock signal with, for example, a Nyquist frequency fN (=31.648 MHz) is supplied. The clock signal received from the terminal 37 is supplied to frequency division circuits 38 and 39. The frequency division circuits 38 and 39 form a signal with a frequency f1=fN/33 (=656 kHz) and a signal with a frequency f2=fN/22 (=984 kHz), respectively. These signals are supplied to the to the selector switches 32 and 33, respectively.

Reference numeral 40 is a terminal to which switching pulses (SWP) in synchronization with the rotation of the rotary heads 36A and 36B are supplied. A signal received from this terminal 40 is supplied to a T1 monostable multivibrator (monomulti) 41. The monomulti 41 forms a timing pulse to establish a delay from the first and second identification signals. The output signal of the monomulti 41 is supplied to both T2 and T3 monostable multivibrators (monomulties) 42 and 43. The T2 and T3 monomulties 42 and 43 form timing pulses equivalent to the pulse durations of first and second identification signals, respectively. One of the output signals of the monomulties 42 and 43 is selected by a selector switch 44. The output signal of the selector switch 44 is supplied to a control terminal to the selector switch 32.

In addition, the signal received form the terminal 40 is supplied to a T4 monostable multivibration (monomulti) 45. The monomulti 45 forms a timing pulse to establish a delay for the tracking detection signal. The output signal of the monomulti 45 is supplied to a T5 monostable multivibrator (monomulti) 46. The monomulti 46 forms a timing pulse equivalent to the pulse duration of the tracking detection signal. The output signal of the monomulti 46 is selected by a selector switch 47. The output signal of the selector switch 47 is supplied to a control terminal of selector switch 33.

Moreover, the signal received form the terminal 40 is supplied to a ½ frequency division circuit 48. The output signal of the frequency division circuit 48 causes the selector switches 44 and 47 to be switched. Furthermore, the signal received from the terminal 40 causes the head selection switch 35 to be switched.

Figure 12:
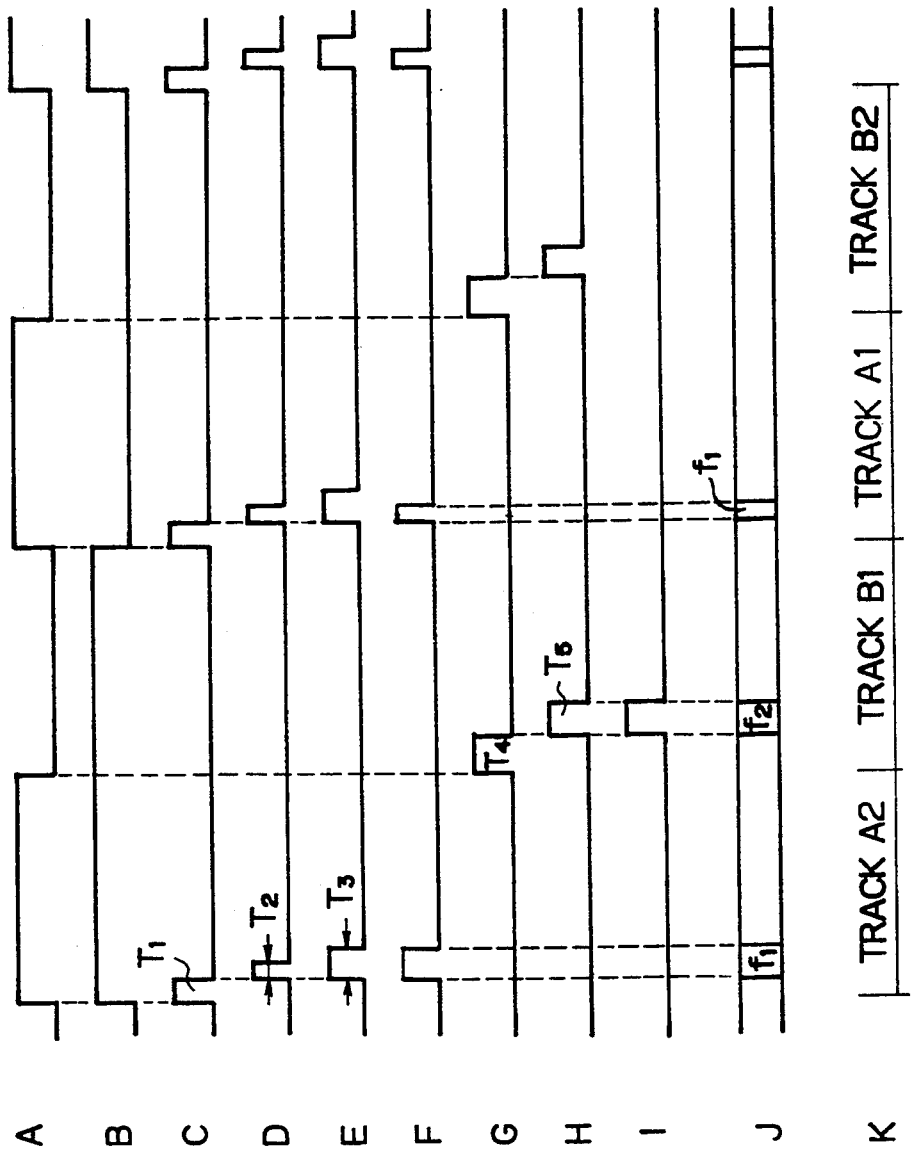
FIG. 12 is a time chart for explaining signal transitions of the recording apparatus of FIG. 11.

Thus, when switching pulses (SWP) as shown at A in FIG. 12 are supplied to the terminal 40, the ½ frequency division circuit 48 outputs a signal shown at B in FIG. 12. The monomulti 41 forms a signal pulse duration corresponding to the delayed beginning of each of first and second identification signals as shown at C in FIG. 12. The monomulties 42 and 43 form pulse signals equivalent to the pulse durations of the first and second identification signals as shown at D and E in FIG. 12, respectively. The selector switch 44 selects one of these signals and forms a signal as shown at F in FIG. 12.

The monomulti 45 forms a signal pulse duration corresponding to the delayed beginning of the tracking detection signal as shown at G in FIG. 12. The monomulti 46 forms a pulse signal equivalent to the pulse duration of the tracking detection signal as shown at H in FIG. 12. The selector switch 47 selects this signal and forms a signal as shown at I in FIG. 12.

The output signals of the selector switches 44 and 47 are supplied to the selector switches 32 and 33, respectively. Thus, the selector switch 33 outputs a signal as shown at J in FIG. 12.

In other words, with respect to tracks A2 and B2, as shown at K in FIG. 12, in a predetermined region of a first record track F2, a first identification signal (frequency f1) with a length of, for example, 4 Dx is recorded. In a predetermined region of a second track B1, a tracking detection signal (frequency f2) with a length of, for example, 4 Dx is recorded. In a predetermined region of a third record track A1, a second identification signal (frequency f1) with a length of, for example, 2 DX is recorded. However, on a fourth record track B2, these signals (frequencies f1 and f2) are not recorded. The first to fourth record tracks A2 to B2 are repeatedly recorded at intervals of four record tracks.

In this manner, the above-mentioned record pattern of FIG. 10 can be recorded. The times T1 to T5 of the monomulties 41 to 46 are set according to the record format of the magnetic tape being used.

Figure 13:
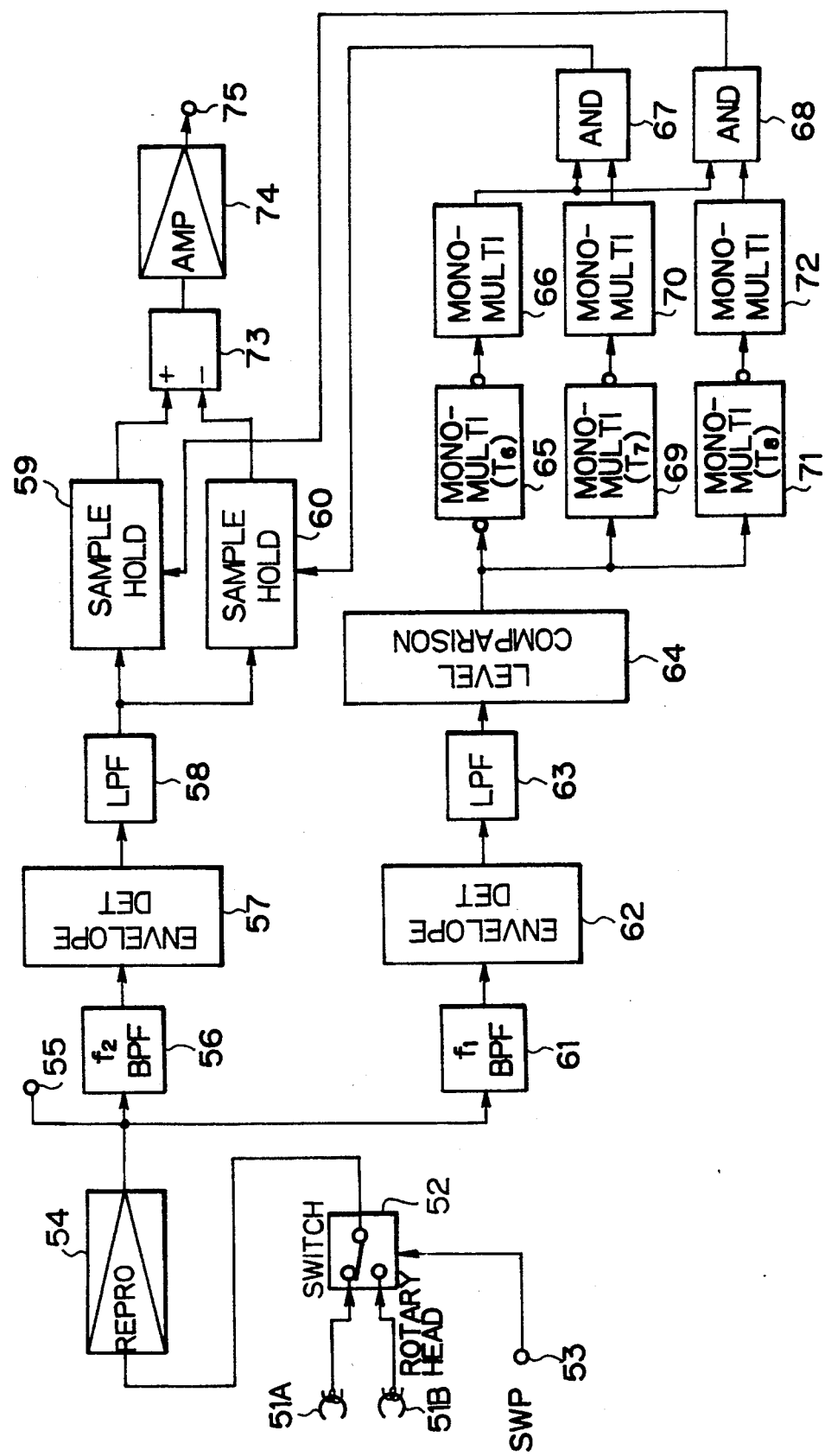
FIG. 13 is a block diagram showing an example of the construction of a reproducing apparatus according to the present invention.

FIG. 13 shows the construction of an example of a reproducing apparatus for reproducing the above-mentioned record pattern of FIG. 10 so as to perform a tracking control operation. In FIG. 13, the output signals of rotary heads 51A and 51B are supplied to a head selection switch 52.

Reference numeral 53 is a terminal to which switching pulses (SWP) in synchronization with the rotations of the rotary heads 51A and 51B are supplied. The output signal of the terminal 53 causes the selection switch 52 to be switched. The output signal of the selection switch 52 is supplied to an output terminal 55 through a reproduction amplifier 54.

In addition, the output signal of the reproduction amplifier 54 is supplied to a band-pass filter (BPF) 56. The BPF 56 outputs a signal with a frequency f2. The output signal of the BPF 56 is supplied to an envelope detection circuit 57. The output signal of the envelope detection circuit 57 is supplied to both sample and hold circuits 59 and 60 through a low-pass filter (LPF) 58.

The output signal of the reproduction amplifier 54 also is supplied to a band-pass filter (BPF) 61. The BPF 61 outputs a signal with a frequency f1. The output signal of the BPF 61 is supplied to an envelope detection circuit 62. The output signal of the envelope detection circuit 62 is supplied to a level comparison circuit 64 through a low-pass filter (LPF) 63. The level comparison circuit 64 outputs a signal which exceeds a predetermined level.

The trailing edge of the output signal of the level comparison circuit 64, this signal triggers a T6 monostable multivibrator (monomulti) 65. The output signal of the monomulti 65 is supplied to a monostable multivibrator (monomulti) 66. The monomulti 66 generates sampling pulses. The output signal of the monomulti 66 is supplied to AND circuits 67 and 68.

The leading edge of the output signal of the level comparison circuit 64 triggers a T67 monostable multivibrator (monomulti) 69. The output signal of the monomulti 69 is supplied to a monostable multivibrator (monomulti) 70. The monomulti 70 generates gate pulses. The output signal of the monomulti 70 is supplied to the AND circuit 67. A sampling pulse of the AND circuit 67 is supplied to the sample and hold circuit 60.

The leading edge of the output signal of the level comparison circuit 64 also triggers a T8 monostable multivibrator (monomulti) 71. The output signal of the monomulti 71 is supplied to a monostable multivibrator (monomulti) 72. The monomulti 72 generates gate pulses. The output signal of the monomulti 72 is supplied to the AND circuit 78. A sampling pulse of the AND circuit 78 is supplied to the sample and hold circuit 59.

The output signals of the sample and hold circuits 59 and 60 are supplied to a differential circuit 73. The output signal of the differential circuit 73 is supplied to an ATF error output terminal 75 through an amplifier 74.

Figure 14:
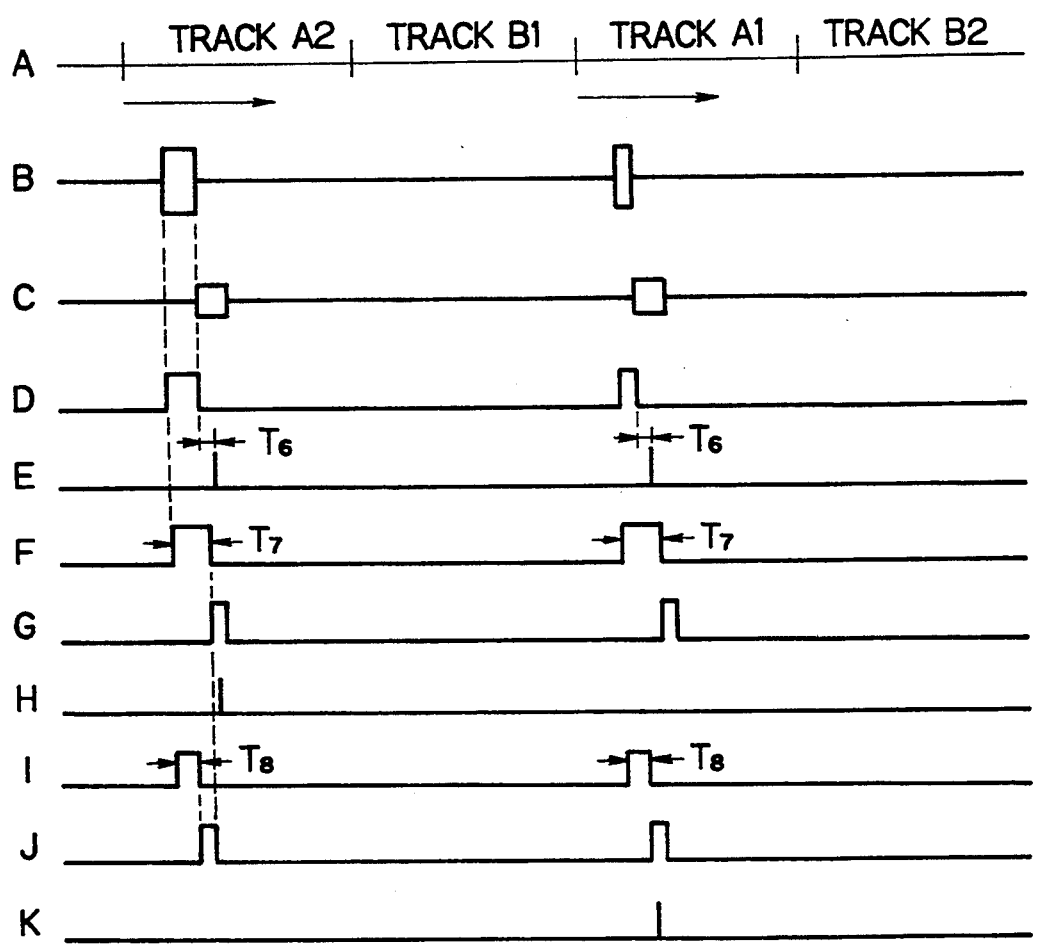
FIG. 14 is a time chart for explaining signal transitions of the reproducing apparatus of FIG. 13.

Thus, in this apparatus, from tracks A2 to B2, as shown at A in FIG. 14, the band-pass filter 61 outputs a signal a shown at B in FIG. 14. The band-pass filter 56 outputs a signal as shown at C in FIG. 14. The level comparison circuit 64 outputs a signal as shown at D in FIG. 14. The monomulti 66 outputs a signal as shown at E in FIG. 14.

The monomulti 69 outputs a signal as shown at F in FIG. 14. The monomulti 70 outputs a signal as shown at G in FIG. 14. Thus, the AND circuit 67 outputs a sampling pulse as shown at H in FIG. 14.

The monomulti 71 outputs a signal at shown at I in FIG. 14. The monomulti 72 outputs a signal as shown at J in FIG. 14. Thus, the AND circuit 68 outputs a sampling pulse as shown at K in FIG. 14.

After the first identification signal (frequency f1) becomes low and the relevant rotary head scans the region of, for example, 4 Dx on the track A2, a crosstalk of the tracking detection signal (frequency f2) is sampled and held by the circuit 60. After the second identification signal (frequency f1) becomes low and the rotary head scans the region of, for example, 2 Dx on the record track A1, a crosstalk of the tracking detection signal (frequency f2) is sampled and held by the circuit 59.

Thereafter, the tracking control operation is performed so that the levels of these crosstalks match. The aforementioned operations for the record tracks A2 and A1 are repeated at intervals of four record tracks.

By reproducing the above-mentioned record pattern of FIG. 10 in this manner, the tracking control operation can be performed. The times T6 to T8 of the monomulties 65 to 71 are set according to the record format of the tape being used.

Figure 15:
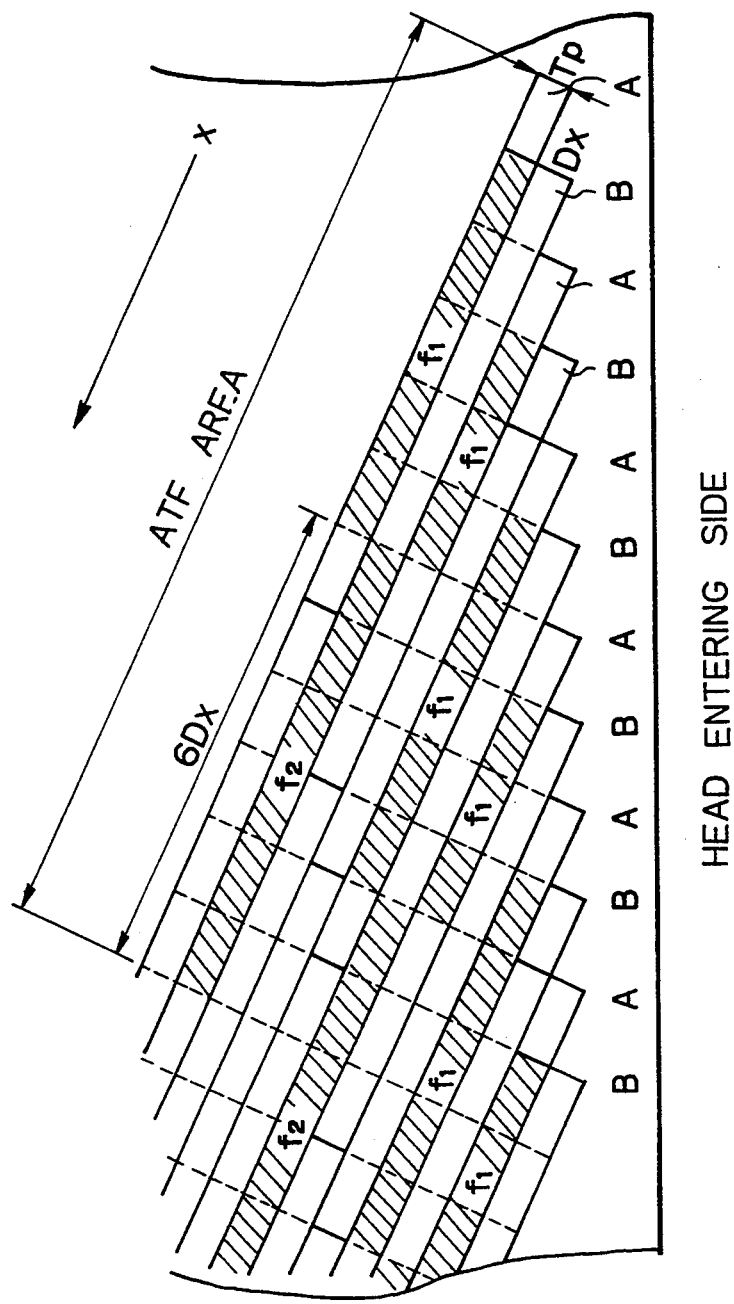
FIG. 15 is a schematic diagram showing another example of a record pattern of pilot signals according to the present invention.

FIG. 15 shows a record format for a high recording density at a low tape traveling speed. In this example, the track offset Dx is short. The length of one identification signal (frequency f1) is, for example, 3 Dx, the length of the tracking detection signal (frequency f2) is, for example, 6 Dx, and the length of the other identification signal (frequency f1) is, for example, 5 Dx. The times T1 to T8 of the monomulties 41 to 46 of the recording apparatus and the monomulties 65 to 71 of the reproducing apparatus are set according to this record format of the tape.

Pilot signals are recorded in ATF areas primarily for a tracking control operation. However, as shown by the patterns of FIGS. 6 and 9, when a pilot signal with frequency f1 is recorded on all tracks, outputs reproduced from the pilot signal can be used as a reference for defining an after-record position in the data area of each track. However, when the frequency f1 of the pilot signal is lowered as with the present invention, for example, to attain advantages such as decreasing the number of recordable wave cycles and varying the phase of the separation low-pass filter, an after-record position cannot be precisely defined. To solve this problem, a timing signal for defining an after-record position can be recorded in a region of the ATF area where pilot signals are not recorded.

According to the present invention, since the record region of each pilot signal can be satisfactorily lengthened without the tradeoff of an increase of the length of the ATF area, a tracking error can be stably detected. In addition, since different frequencies for pilot signals are used, even if a head scans a track that had been recorded with a different azimuth, a correct tracing state can be quickly obtained.

According to the present invention, the length of a tracking detection signal can be freely set. Thus, limitations relating to product compatibility re alleviated. As a result, restrictions on production, such as an increase of the number of adjustment steps and a decrease in the yield of the products, can be removed.

What is claimed is:

1. A tracking control apparatus for use in a rotary head type recording unit having a first rotary head and a second rotary head for forming pairs of slant tracks on a magnetic tape, each track in the pair having a head entering side and a head leaving side in the direction along the track, said head entering side containing a tracking region and said head leaving side containing a tracking region, said apparatus comprising:

means for generating first and second pilot signals of different frequencies for controlling a tracking operation; and means for supplying said first pilot signal to at least one of said rotary heads when said head is disposed in the tracking region of said head entering side for recording said first pilot signal at a predetermined position in the tracking region on said first track and for supplying said second pilot signal to one of said rotary heads for recording at a predetermined position in the tracking region of said head entering side on said second track adjacent said first track, said first pilot signal preceding said second pilot signal in the direction along the track, to form a particular pattern of pilot signals from track to track, said means for supplying being operative to supply said first and second pilot signals to said rotary heads when disposed in the tracking region of said head leaving side to record a pattern of pilot signals from track to track at said head leaving side which is substantially the reverse of said particular pattern.

2. The apparatus of claim 1 wherein said first pilot signal is supplied to said first and second rotary heads for recording in the tracking region of said head entering side of both said first and second tracks and for recording in the tracking region of said head leaving side of both said first and second tracks.

3. The apparatus of claim 2 wherein said means for supplying is operative to supply said first pilot signal to said first rotary head for a first duration when said first rotary head reaches a first position in the tracking region of the head entering side of said first track, to supply said first pilot signal to said second rotary head when said second rotary head reaches a second position in the tracking region of the head entering side of said second track substantially corresponding to the end of said first pilot signal in the tracking region of the head entering side of said first track, and to supply said second pilot signal to said second rotary head after said first pilot signal is supplied to said second rotary head.

4. A method for forming slant record tracks on a tape by rotary heads, said method comprising the steps of:

recording a tracking detection signal on a record track disposed at intervals of n tracks, where n is a predetermined number, so that crosstalks of said tracking detection signals are not detected at the same time when a rotary head scans a given track; and recording a first identification signal and a second identification signal having the same frequency but exhibiting different durations from each other on tracks which are adjacent the record track on which said tracking detection signal is recorded such that the record length of said first identification signal exceeds the record length of said second identification signal.

5. A rotary head type recording apparatus for forming slant record tracks on a tape, said apparatus comprising:

means for identifying every n-th record track where n is a predetermined number;

means for supplying a first identification signal having a first duration to a rotary head for recording in each said identified track along a predetermined length such that when said first identification signal subsequently is played back, crosstalk form adjacent tracks is not picked up;

means for supplying a tracking detection signal to said rotary head for recording in a second record track that is adjacent to said identified record track; and means for supplying a second identification signal having the same frequency as said first identification signal and a second duration to said rotary head for recording in a third track that is adjacent to said second record track such that the record length of said first identification signal exceeds the record length of said second identification signal.

6. A rotary head type reproducing apparatus having rotary heads for reproducing signals from slant record tracks formed on a tape, said signals including a first identification signal having a first duration recorded in a first length of a first track, a tracking detection signal recorded in a second track adjacent said first track and a second identification signal having the same frequency as said first identification signal and recorded in a second length in a third track adjacent said second track, said first length exceeding said second length, said apparatus comprising:

means for detecting said first identification signal from signals reproduced from said record tracks;

means responsive to the termination of said first identification signal for detecting a first crosstalk component of a tracking detection signal;

means for detecting said second identification signal from the signals reproduced from said record tracks;

means responsive to the termination of said second identification signal for detecting a second crosstalk component of said tracking detection signal; and means for performing a tracking operation of said rotary heads as a function of said first and second crosstalk components.

7. The apparatus of claim 6 wherein said means responsive to said first identification signal and said means responsive to said second identification signal each comprises timing means for sampling a crosstalk component that is present after termination of the respectively detected first or second identification signal.

8. A rotary head type recording and reproducing apparatus having rotary heads for recording and reproducing signals in and from slant record tracks on a record medium, said apparatus comprising:

means for identifying every n-th record track wherein n is a predetermined number;

means for supplying a first identification signal having a first duration to a rotary head for recording in each said identified track along a predetermined first length such that when said first identification signal subsequently is played back, crosstalk from adjacent tracks is not picked up;

means for supplying a tracking detection signal to said rotary head for recording in a second record track that is adjacent to said identified record track;

means for supplying a second identification signal having the same frequency as said first identification signal and a second duration to said rotary head for recording in a predetermined second length in a third track that is adjacent to said second record track, said first and second lengths differing from each other;

means for detecting said first identification signal from signals reproduced from said record tracks;

means responsive to the termination of said first identification signal for detecting a first crosstalk component of said tracking detection signal;

means for detecting said second identification signal from the signals reproduced from said record tracks;

means responsive to the termination of said second identification signal for detecting a second crosstalk component of said tracking detection signal; and means for performing a tracking operation of said rotary heads as a function of said first and second crosstalk components.

9. The apparatus of claim 8 wherein said means responsive to said first identification signal and said means responsive to said second identification signal each comprises timing means for sampling a crosstalk component that is present after termination of the respectively detected first or second identification signal.

10. A method of forming slant tracks on a tape by rotary heads, comprising the steps of:

recording a tracking detection signal on a record track disposed at intervals of n tracks, where n is a predetermined number, so that crosstalk from another tracking detection signal is not detected at the time that a rotary head scans a given track;

recording an identification signal on first and second record tracks both of which are adjacent the record track on which the tracking detection signal is recorded, the identification signal in said first and second tracks being in advance of said tracking detection signal in the direction along the track; and recording said identification signal in the track on which the tracking detection signal is recorded and in advance of said tracking detection signal.

11. Rotary head recording apparatus for recording slant record tracks on a tape, comprising:

means for identifying every n-th record track, where n is a predetermined number;

means for supplying an identification signal to a first rotary head for recording in each said identified track;

means for supplying a tracking detection signal to a second rotary head for recording in a second record track that is adjacent to said identified record track and located in lagging relation to said identification signal in the direction along the track;

means for supplying said identification signal to said second rotary head for recording in said second track in advance of said tracking detection signal; and means for supplying said identification signal to said first rotary head for recording in a third track that is adjacent said second track and located in advance of said tracking detection signal.

* * * * *